L. C. REESE.
APPARATUS FOR DETERMINING THE SPECIFIC GRAVITY OF DOUGHS, PASTES, AND THE LIKE.
APPLICATION FILED AUG. 29, 1919.

1,337,410.

Patented Apr. 20, 1920.

INVENTOR
Louis Charles Reese,

L. C. REESE.
APPARATUS FOR DETERMINING THE SPECIFIC GRAVITY OF DOUGHS, PASTES, AND THE LIKE.
APPLICATION FILED AUG. 29, 1919.
1,337,410.
Patented Apr. 20, 1920.
2 SHEETS—SHEET 2.
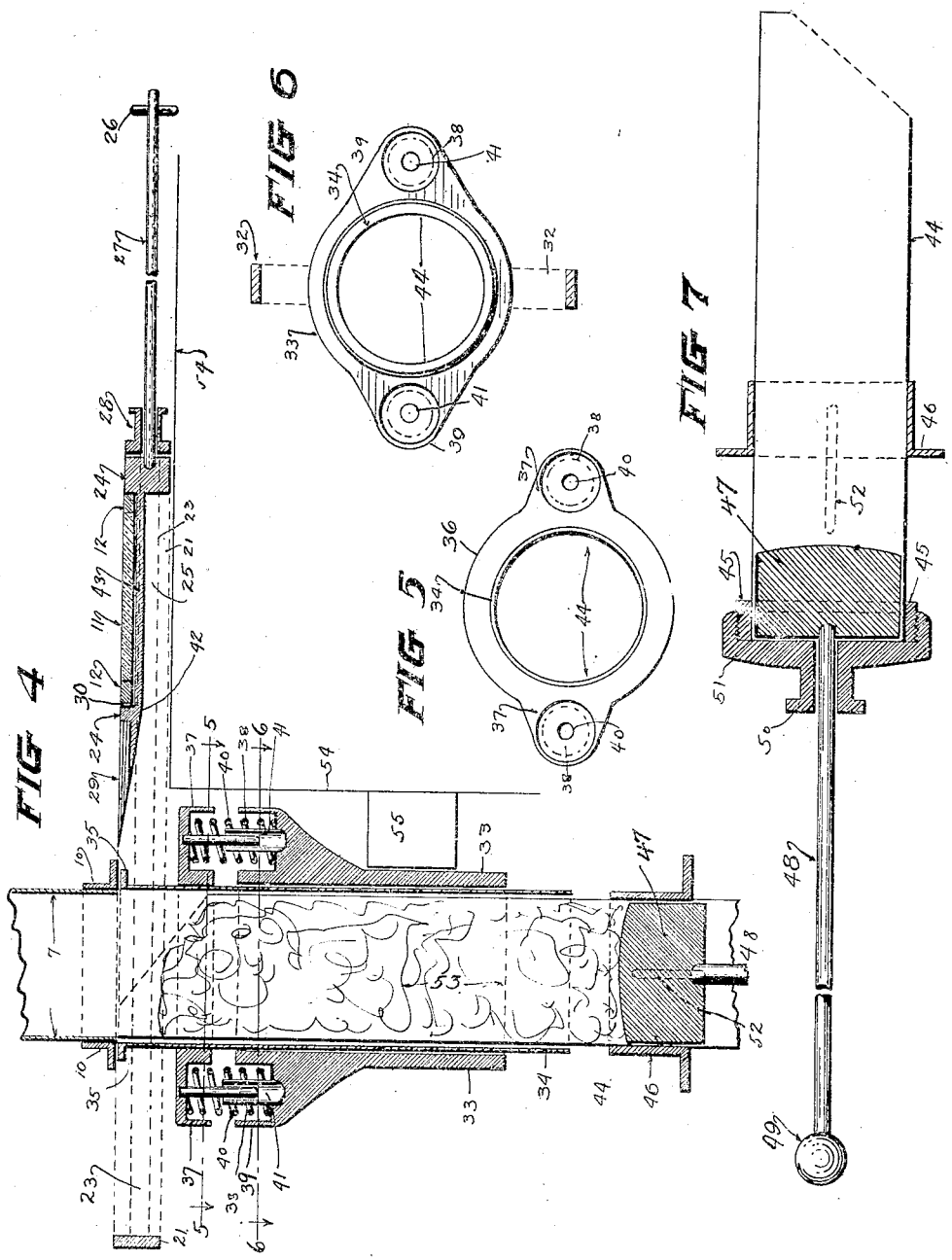
INVENTOR
Louis Charles Reese,

UNITED STATES PATENT OFFICE.

LOUIS CHARLES REESE, OF SAGINAW, MICHIGAN.

APPARATUS FOR DETERMINING THE SPECIFIC GRAVITY OF DOUGHS, PASTES, AND THE LIKE.

1,337,410.   Specification of Letters Patent.   Patented Apr. 20, 1920.

Application filed August 29, 1919. Serial No. 320,736.

*To all whom it may concern:*

Be it known that I, LOUIS CHARLES REESE, residing at Saginaw, in the county of Saginaw and State of Michigan, have invented a new and useful Apparatus for Determining the Specific Gravity of Doughs, Pastes, and the like, of which the following is a specification.

My invention has reference to the determination of the specific gravity of doughs, pastes, putty, butter and fats of similar consistency, thick paints, cements, mortars and like products which in consequence of their extreme adhesiveness to other matters with which they come in contact, and of their tenacity or elasticity can only be handled for the above purpose with the greatest difficulty, and has for its object to perform this operation easily, cleanly, quickly and accurately.

According to my invention I use for weighing a determinable volume of the paste or like matter to be examined a cylindrical glass flask of known capacity and weight, which is open at one end—the bottom—in its whole width for charging the matter to be tested thereinto, and reduced at the opposite end to a narrow, cylindrical, open neck provided with measuring marks and an evenly ground top rim closable by a small ground-on glass plate. After the flask has been duly charged, its open bottom is closed by a bottom plate, preferably a ground-on glass plate fitted with means for fastening it tightly to the same. I take the sample for the charge from the bulk of the material to be tested by means of a special cylindrical sampling tube having exactly the same inner diameter as the cylindrical part of the measuring flask, place the charged tube coaxially to the latter against its open bottom, fixed to a suitable frame, and then force by means of a plunger the material contained in the sampling tube from the latter into the flask, until it is duly charged as required for the purpose. While still keeping the sampling tube in this position and the plunger under slight pressure, I sever the material contained in the measuring flask from the rest remaining in the sampling tube by means of a knife the cutting edge of which is broader than the diameter of the flask and tube, and which, tightly gliding along between the two, closes the open end of the flask preventing any air from entering accidentally at the same time. This knife is arranged at the front part of a shutter sliding in grooves arranged in the frame carrying the flask as mentioned above. Behind the knife the top of the shutter is provided with a recess adapted to receive the bottom plate of the flask. The shutter, the knife, the recess for the bottom plate and the grooves in the frame are so arranged that the top surfaces of the knife, of the bottom plate, when in the recess, and of that part of the shutter situated between the two form a completely even plane, gliding so tightly along the whole width of the opening of the flask that no air can enter in this way into the latter.

As soon as the knife has passed completely through between the flask and the sampling tube, the latter is removed, and the shutter is further pushed forward until the bottom plate is in perfect alinement with the bottom part of the flask, whereupon the latter and the former are fastened together. The flask is then disconnected from the frame and ready to be weighed for determining the weight of the material contained therein and thus its specific gravity.

As the knowledge of the exact specific gravity of the mostly very complicated products mentioned above enables us to make clear and often important deductions in regard to their composition, the great advantage of an apparatus for easily and accurately making these determinations is obvious.

The accompanying drawings show an example of the construction and arrangement of the apparatus forming the object of my invention.

Fig. 4 is a vertical section on the line 4—4 of Fig. 1 of the lower part of the flask, of the frame and its accessories. of the shutter completely drawn out and having the bottom plate of the flask in its recess, and of the upper part of the sampling tube filled with the material to be tested and ready for charging the flask.

Fig. 5 is a section on line 5—5, and Fig. 6 on line 6—6 of Fig. 4.

Fig. 7 is a longitudinal section through the axis of the empty sampling tube, ready for filling.

Figure 2:
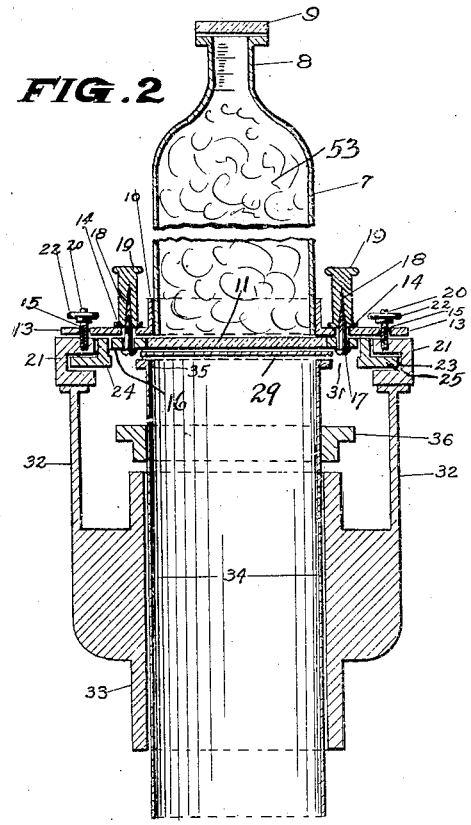
Fig. 2 is a vertical cross section of the guide tube and flask, showing the flask filled, closed and connected to its bottom plate, ready to be disconnected from the apparatus.
Figure 3:
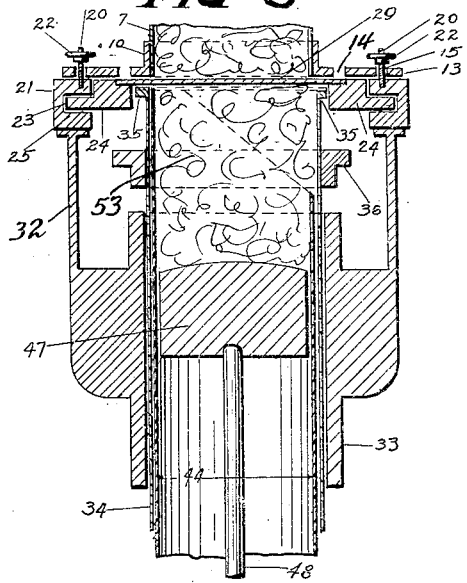
Fig. 3 is a vertical cross section of the guide tube, sampling tube and lower part of the flask at the end of the filling operation, showing the blade in the act of severing the mass.
Figure 1:
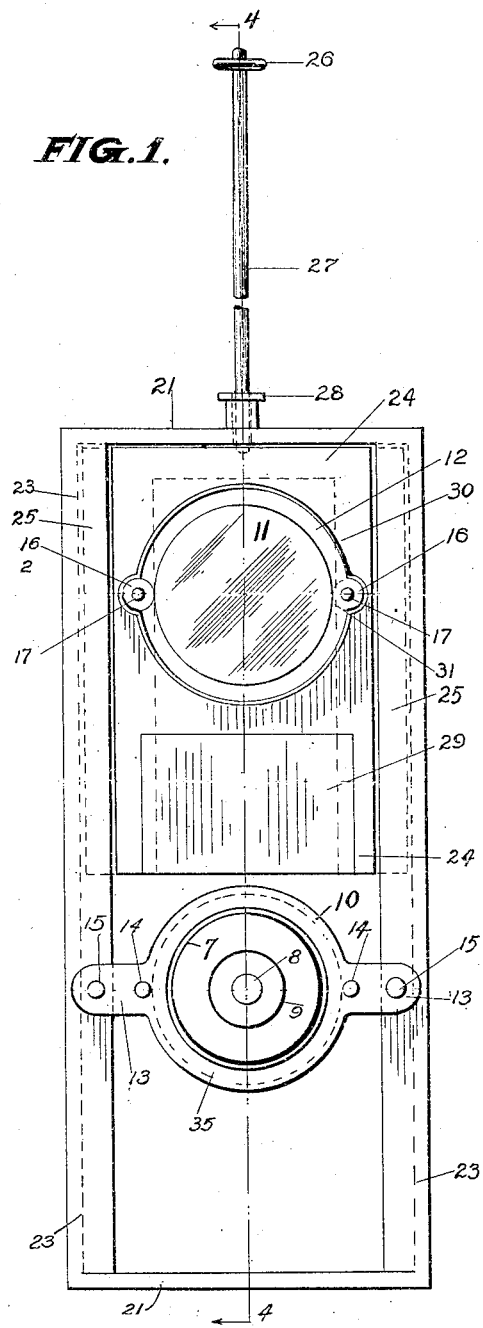
Figure 1 is a top plan view of the invention.

In the drawings, 7 indicates the cylindrical measuring flask of glass, 8 its narrow neck with the measuring marks, 9 a small ground-on glass plate serving as cover for the neck, and 10 the metal flange fixed to the edge of the open bottom of the flask 7. The latter, when in the charged condition, is closed by the bottom plate 11 made of glass and surrounded by the metallic rim 12 fitting to the flange 10. The latter has two opposite projections 13, each provided with two holes, 14 and 15, and the rim 12, two smaller opposite projections 16, each provided with one hole 17. The holes 14 of the flange 10 and the holes 17 of the rim 12 correspond to each other and are adapted to receive the screw bolts 18; screw keys 19, running over the threaded ends of these bolts serve to firmly connect the rim 12 with the flange 10 and thus to close tightly the open bottom of the flask 7 by the glass plate 11. The holes 15 of the flange 10 are so arranged as to receive the screw pins 20 rigidly set on the top part of the longer sides of the frame 21, to which, when the flask 7 is to be charged, the flange 10 is fixed by means of the screw nuts 22 running over the threaded ends of the pins 20. The lengths of the stems of the keys 19 and of the ends of the pins 20 protruding above the flange 10, when the latter is connected to the frame 21, and the height of the screw nuts 22 must be such that the latter can be conveniently removed from their pins 20, while the keys 19 are in the position necessary for tightly holding the rim 12 and the flange 10 together.

The frame 21 is provided at its long sides with the grooves 23, in which the shutter 24 slides on its guides 25. It is worked by the handle 26 arranged at the end of the rod 27 fixed to the backpart of the shutter and moving in the stuffing box 28 attached to the crosspiece of the frame 21. The shutter 24 carries at its front the knife 29 having a very sharp and gradually declining cutting edge and broader than the diameter of the flask 7, and is provided behind the knife with the recess 30 adapted to receive the bottom plate. It is essential that the rim 12 of the latter fits tightly in the recess 30, that the upper surfaces of the knife 29, the rim 12, the glass plate 11 and the part of the shutter 24 situated between the back-end of the knife 29 and the rim 12 form an absolutely level plane, and that the guides 25 of the shutter and the grooves 23 in the frame are so constructed and arranged that this even plane moves parallel and in closest proximity to the under surface of the flange 10 of the flask, the knife 29 passing the whole width of the open bottom of the flask, and the holes 17 of the rim 12 coming automatically into alinement with the holes 14 in the flange 10 fixed to the frame. In order to easily insert the bolts 18 into the superimposed holes 14 and 17, that part of the shutter 24 supporting the bottom plate 11 is provided with openings 31 in alinement with the above holes.

The frame 21 carries by means of the brackets 32 fixed to its underside the stationary guide tube 33 serving as guide for the secondary guide tube 34 sliding therein, and so adapted and arranged as to direct the sampling tube 44, when pushed into the same for charging the flask 7 in its position on the frame 21, against the edge of its open bottom and coaxially to its cylindrical part. The secondary guide tube 34 is fitted at its top with the flange 35 parallel to the flange 10, and has rigidly affixed to its outside beneath 35 at suitable distances from the frame 21 and the stationary guide tube 33 the ring 36 carrying the brackets 37 adapted to receive the top parts of the springs 38 fixed with their lower ends to the brackets 39 forming one piece with the tube 33. The pins 40 fixed in the brackets 37 are arranged to slide in the tubes 41 fixed in the brackets 39, and thus secure the proper position of the springs 38 as well as of the sliding tube 34. The flange 35 of the latter is slightly cut-away at its outside rim at the point, where the knife 29, when pushed forward, first touches it, in order to facilitate its entrance between the corresponding flanges 35 and 10. The springs 38 force the brackets 37 with their ring 36 and thereby the secondary guide tube 34 with its top flange 35 upward toward the bottom end of the flask 7, the flange 35 being thus firmly pressed first, while the flask 7 is being charged, against its flange 10, and then, after this operation has been finished and the shutter is moved forward, against the lower inclined surfaces 42 of the knife and the recessed supports 43 of the latter and of the bottom plate (see Fig. 4), keeping the latter in its proper position until it is fixed to the flange 10.

The sampling tube, shown in Fig. 7, consists of the open cylinder 44 cut-away at one end and provided at its other end with the screw ring 45 and between the two with the flange 46, forming the mark unto which the tube is to be driven into the mass from which the sample is taken. The plunger for forcing the mass collected in the tube out of its open end consists of the piston 47 worked by means of the rod 48 provided with the handle 49. The rod 48 is guided in the stuffing box 50 formed in one piece with the screw cap 51 fitting over the thread of the screw ring 45. Openings 52 are provided in the wall of the tube 44 for allowing the air inclosed therein between the mass in the forward part of the tube and the piston to escape. The sampling tube 44 has exactly the same inner diameter as the cylindrical part of the flask 7 and slides tightly in the secondary guide tube 34 so that, when the tube 44 is pushed home within the latter against the flange 10, no obstacle prevents in the slightest degree the free passage of the mass 53 from the tube into the flask 7.

The latter is thus charged with a compact mass of the sample to be tested, free of any adhering air, in an easy, exact and clean manner.

For conveniently working the apparatus I fix that part of the frame 21, in which the rod 27 travels, to the edge of a table or to a box high enough to insert the sampling tube 44 with its plunger drawn out into the tube 34, as indicated in Fig. 4, in which 54 represents the outline of a box on the top of which the frame 21 rests, and 55 a bracket attached to the side of this box and so arranged as to secure the proper position of the stationary guide tube 33.

For determining the specific gravity of the materials mentioned above by means of the apparatus described, the measuring flask 7, the top cover 9, the bottom cover 11 with rim 12, the bolts 18 and keys 19 are first weighed together; then the bottom cover is inserted in the recess 30 of the shutter 24, and the open flask 7 is connected to the top of the frame 21 by means of the screwpins 20 and their nuts 22. The sample for the test is taken from the bulk of the material by means of the sampling tube 44, which is filled until the mass appears at the side openings 52. The tube 44 is then pushed upward into the secondary guide tube 34 until it presses against the bottom edge of the flask 7, and the material contained in tube 44 is forced upward by means of the plunger 47 into this flask until it is duly charged. Keeping the plunger in the same position under slight pressure on the mass, the shutter 24 is pushed forward by means of the rod 27, until the knife 29 has completely severed the mass in the flask 7 from that in the tube 44, whereupon the latter is removed. The shutter 24 is then further pushed forward, until the holes 17 of the rim 12 of the coverplate 11 are in alinement with the holes 14 of the flange 10 of the flask; the screwbolts 18 are inserted from beneath through the openings 31 of the shutter 24 into their holes 17 and 14 and the keys 19 screwed home so that the plate 11 firmly and tightly closes the bottom of the flask 7.

The nuts 22 are thereupon unscrewed from the pins 20 of the frame 21. The flask 7, thus loosened from the frame 21, is then removed and, after the plate 9 has been put on, weighed.

Any number of measuring flasks with their necessary accessories may be employed for the same frame and shutter, and in this way a great many determinations may be made successively in a short time with the same accuracy.

I claim:

1. An apparatus for the purpose described, comprising a cylindrical, measuring flask open at its bottom end and provided with a narrow, open neck, a bottomplate adapted to be tightly connected to and to close the open bottom end of the said flask, a cylindrical sampling tube having the same inner diameter as the cylindrical part of the latter, means for holding the said sampling tube in a position coaxial to the said flask, a plunger fitting in the sampling tube and adapted to force the material contained in the latter into the said flask, a knife arranged to slip between the said sampling tube and the flask closely to the bottom of the latter for separating the mass in the said flask from that left in the said sampling tube and for closing at the same time the open bottom end of the former, and means for causing the bottom plate of the said flask to follow the said knife in exactly the same plane into a position ready to be connected to the said flask.

2. An apparatus for the purpose described, comprising a cylindrical flask open at its bottom end, a bottom plate adapted to be tightly connected to and to close the open bottom of the said flask, a frame lengthwise provided with grooves, means to connect the lower part of the said flask to the said frame, a cylindrical sampling tube having the same inner diameter as the open bottom end of the said flask and provided with a plunger, means attached to the lower part of the said frame for guiding the said sampling tube into a position coaxial to the said flask, a shutter sliding in the grooves of the said frame, means for working the said shutter, a knife broader than the open bottom of the said flask and arranged at the front of the said shutter, and a recess provided in the top part of the latter for receiving the said bottom plate, the top surfaces of the latter, when in the said recess, of the said knife and of that part of the said shutter between the two forming a plane parallel and in close proximity to that formed by the bottom end of the said flask, and the said shutter and the said frame being so arranged, that, when the former is pushed forward toward the said flask, first the said knife glides closely along the bottom end of the latter, severing the mass contained in the said flask from that contained in the said sampling tube and closing the former at the same time, and then the said bottom plate, following the said knife, is placed in alinement with the bottom end of the said flask, whereupon the latter is connected to the said bottom plate, disconnected from the said frame and removed duly closed.

3. An apparatus for the purpose described, comprising a cylindrical flask open at its bottom end, a bottom-plate adapted to be tightly connected to and to close the bottom end of the said flask, a frame lengthwise provided with grooves, means to connect the lower part of the said flask to the upper part of the said frame, a cylindrical sampling tube having the same inner diameter as the said flask and provided with a plunger, a stationary guide tube rigidly fixed to the lower part of the said frame and coaxially to the said flask when connected to the latter, a secondary guide tube sliding in and coaxially to the said stationary guide tube and having an inner diameter suitable to receive the said sampling tube, resilient means arranged on the said stationary guide tube for pressing the top of the secondary guide tube against the rim of the bottom end of the said flask, a shutter sliding in the grooves of the said frame, means for working the said shutter, a knife broader than the open bottom of the said flask and arranged at the front of the said shutter, a recess provided in the top part of the latter for receiving the said bottom plate, and a recess cut in the bottom part of the said shutter and declining evenly from the under surface of the said knife toward that part supporting the said bottom plate for allowing the top of the said secondary guide tube, pressed upward by the said resilient means, to slide easily along the bottom of the said shutter, when the latter is pushed forward underneath the said flask, the said shutter and the said frame being so arranged that, when this action takes place, first the said knife slides closely along the bottom end of the said flask, severing the mass contained therein from that contained in the said sampling tube held in and guided by the said secondary guide tube, and closing the bottom of the said flask at the same time, and then the said bottom plate, following the said knife, is placed in alinement with the bottom end of the said flask, whereupon the latter is connected to the said bottom plate, disconnected from the said frame and removed duly closed.

LOUIS CHARLES REESE